United States Patent [19]

Comer

[11] Patent Number: 4,514,875
[45] Date of Patent: May 7, 1985

[54] HIGH CAPACITY FILTER FOR FLOOR CLEANING MACHINES AND THE LIKE

[75] Inventor: Philip L. Comer, Bowling Green, Ohio

[73] Assignee: McGraw-Edison Company, Rolling Meadows, Ill.

[21] Appl. No.: 475,718

[22] Filed: Mar. 16, 1983

[51] Int. Cl.³ .............................................. A47L 11/24
[52] U.S. Cl. ....................................... 15/349; 15/352; 55/302; 55/484; 55/498
[58] Field of Search ................. 15/347, 348, 349, 352; 55/302, 484, 498, 499, 300

[56] References Cited

U.S. PATENT DOCUMENTS

| | | | |
|---|---|---|---|
| 3,167,415 | 1/1965 | Edwards | 55/302 |
| 3,304,572 | 2/1967 | Wendel | 15/340 |
| 3,570,040 | 3/1971 | Wada | 15/349 |
| 3,633,757 | 1/1972 | Madern | 55/498 X |
| 3,692,184 | 9/1972 | Miller et al. | 55/499 X |
| 4,007,026 | 2/1977 | Groh | 55/498 |
| 4,099,940 | 7/1978 | Mortensen et al. | 55/300 |
| 4,133,657 | 1/1979 | Krogsrud | 55/498 X |
| 4,224,044 | 9/1980 | King | 55/498 X |
| 4,328,014 | 5/1982 | Burgoon et al. | 55/300 |

Primary Examiner—Chris K. Moore
Attorney, Agent, or Firm—Allen D. Gutchess, Jr.

[57] ABSTRACT

A high capacity filter and filtering system for a floor cleaning machine is provided. The floor cleaning machine comprises a frame, wheels supporting the frame on the surface to be cleaned, a rotatable sweeping brush carried by the frame, and a hopper carried by the frame near the sweeping brush. The hopper has a dirt- and debris-receiving opening at a lower rear portion thereof through which dirt and debris are received from the brush. A dividing wall extends between side walls of the hopper and divides it into a lower dirt- and debris-receiving chamber and an upper exhaust chamber with an inlet opening communicating between the chambers. A manifold is removably supported by the hopper in the exhaust chamber and a plurality of filters extend downwardly from the manifold into the exhaust chamber. Each of the filters has an outer surface and a central, inner chamber which communicates with the interior of the manifold. An exhaust blower has an outlet communicating with the exterior of the hopper and an inlet communicating with the interior of the manifold. Airborne dirt is collected on the exterior of the filters when the air is drawn through the hopper and the exhaust chamber. A shaker motor is carried by the manifold to periodically shake dirt from the filters when it is operated. Air passages are also provided to supply air under pressure from the exterior of the hopper into the central chambers in the filters to expel collected dirt therefrom periodically.

11 Claims, 5 Drawing Figures

HIGH CAPACITY FILTER FOR FLOOR CLEANING MACHINES AND THE LIKE

This invention relates to a high capacity filter and filtering system for a floor cleaning machine and the like.

Floor sweeping machines with a variety of filters in the hoppers are known in the art. Such filters have adequate filtering capabilities for common industrial and commercial sweeping applications. However, such sweepers have been found to be ineffective for certain applications, such as where large quantities of fine particulate materials are swept from surfaces. The filters quickly load up and require frequent cleaning or changing to the point of being impractical.

The present invention provides a machine for sweeping surfaces having a high capacity filter and filtering system enabling the machine to clean surfaces even having layers of fine particulate material thereon which would quickly render inoperable sweeping machines heretofore known. The sweeping machine comprises a frame with wheels supporting the frame on the surface and a rotatable sweeping brush carried by the frame. A hopper is also carried by the frame and has a dirt- and debris-receiving opening at a lower rear portion thereof through which dirt and debris are received from the brush. A dividing wall extends between side walls of the hopper and forms a lower dirt- and debris-receiving chamber in the hopper and an upper exhaust chamber, with an inlet opening between the chambers.

A manifold is removably carried by the hopper and has filters extending downwardly therefrom into the exhaust chamber. Each of the filters has a filter medium with pleats, the outer extremities of which define a generally cylindrical outer surface and the inner extremities of which define a generally cylindrical inner chamber. The latter chamber communicates with the interior of the manifold and an exhaust blower has an inlet also communicating with the interior of the manifold and an outlet communicating with the exterior of the hopper. Air is thereby drawn through the lower and exhaust chambers, the filters, and the manifold, with air-borne dirt collected on the outer surfaces of the filters.

A shaker motor is mounted on the manifold which, when operated, shakes the filters to shake dirt collected thereon downwardly to an upper portion of the dividing wall from which it can be dumped when the hopper is dumped. Air supply tubes also extend into the central, inner chambers of the filters and have supply hoses communicating with the exterior of the hopper. Air under pressure can be periodically supplied to the hoses to supply air through the filters in the reverse direction to expel collected dirt therefrom.

The manifold is removably mounted in the hopper and preferably is supported on shock-mounted supports therein. An upper cover of the hopper can be opened to remove the manifold along with the filters for further cleaning or for replacing the filters. For this purpose, the filters are removably connected to the manifold by threaded connections or the like.

The filters themselves are made of a commercially-available filter medium formed into a multiplicity of generally radially-extending pleats. The outer extremities of the pleats are arranged in the generally cylindrical configuration as are the inner extremities which form the central, inner chamber. Circumferentially-extending strips of plastic material are applied to spaced portions of the outer extremities of the pleats. The plastic material extends inwardly between the outer extremities to maintain the pleats in the spaced relationship as air is drawn therethrough from the outer surfaces toward the central chamber. A plurality of circumferentially-extending, generally parallel wires are located around the outer extremities of the filter pleats and a plurality of longitudinally-extending, generally parallel wires are also positioned around the outer surface and extend between end caps at the ends of the filter medium. An inner mesh retainer is located in a cylindrical configuration at the inner extremities of the pleats.

It is, therefore, a principal object of the invention to provide a floor cleaning machine with a high capacity filtering system and filters.

Another object of the invention is to provide a filtering system for a hopper which includes a dividing wall in the hopper forming a dirt- and debris-receiving chamber and an exhaust chamber, and a manifold having high capacity filters extending into the exhaust chamber.

A further object of the invention is to provide an improved filter for a floor cleaning machine including a manifold having a plurality of filters extending therefrom and a shaker motor mounted on the manifold to shake the filters.

Still another object of the invention is to provide a filter for a floor cleaning machine having high pressure air supply means for supplying air under pressure to the interior of the filter to supply air through the filter in the opposite direction from the direction of the air during a filtering operation.

Still a further object of the invention is to provide a high capacity filter having a filter media forming a multiplicity of pleats with the outer extremities of the pleats being surrounded by a wire retainer and the inner extremities of the pleats having a cylindrical inner mesh, and with means extending between portions of the outer extremities of the pleats to maintain them in spaced relationship.

Many other objects and advantages of the invention will be apparent from the following detailed description of a preferred embodiment thereof, reference being made to the accompanying drawings, in which.

Figure 1:
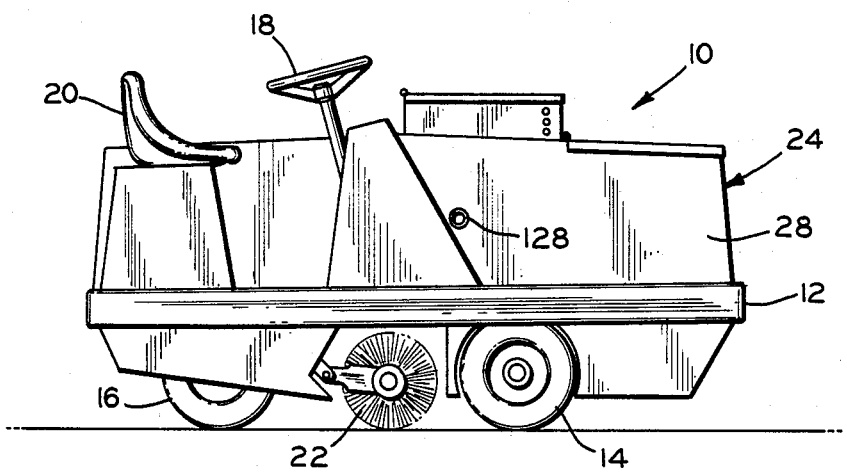
FIG. 1 is a schematic side view in elevation of a floor cleaning machine embodying the invention.

Referring to FIG. 1, a floor-cleaning machine and specifically a riding sweeper embodying the invention is indicated at 10. The machine includes a main frame or body 12 with forward wheels 14 and a central rear wheel 16 which is steered through suitable mechanism by a steering wheel 18 located in front of an operator's seat 20. A rotatable sweeping brush or broom 22 is located to the rear of the wheels 14.

A hopper 24 is positioned near the rotatable brush 22 to receive dirt and debris therefrom. The hopper 24 includes a bottom wall 26, side walls 28, a forward wall 30, and a rear wall 32. The rear wall 32 defines a dirt- and debris-receiving opening 34 which receives dirt and debris from the rotatable brush 22 and also dumps the dirt and debris from the hopper when it is tilted to a dumping position. The rear wall 32 also defines an upper discharge opening or slot 36 above the opening 34 through which filter dirt can be discharged when the hopper is tilted counterclockwise to the low dump position. In a normal operating position, the upper slot 36 is sealed off by a peripheral seal located in a housing around the rotary brush 22. A pivotal lip 38 is pivotally connected to the bottom wall 26 and forms an extension thereof extending to the lower edge of the hopper opening 34. The lip 38 pivots upwardly when the sweeper encounters larger debris and then pivots downwardly again under gravity so that the debris can be swept into the hopper 24 by the brush 22.

The filtering system in accordance with the invention includes a dividing wall 40 (FIG. 2) extending between the side walls 28 of the hopper 24 and dividing the hopper into a lower, dirt- and debris-receiving chamber 42 and an upper, exhaust chamber 44. The dividing wall 40 includes a slanted portion 46 below the filters and defining the lower edge of the upper slot 36 and the upper edge of the lower opening 34. The wall also has an upright portion 48 in front of the filters and a separate, forwardly extending, forward portion 50 forming an air passage 52 with an upper, inner wall 54 and side walls. These also define an inlet opening 56 communicating between the lower chamber 42 and the exhaust chamber 44. The forward portion 50 slants downwardly in a rearward direction to prevent build-up of dust thereon. Both of the walls 52 and 54 are attached to a lid 57 and swing up therewith when the hopper 24 is raised and tilted clockwise to a high dump position. A gasket 59 is located between the rear edges of the walls 52 and 54 and the wall structure forming the exhaust chamber 44.

A filter assembly indicated at 58 (FIGS. 2-4) is located in the exhaust chamber 44. The assembly includes a manifold 60 and a plurality of filters 62 extending into the exhaust chamber. The manifold has a top wall 64, end walls 66, side walls 68, and a bottom wall 70.

A shaker motor 72 (FIG. 3) with an eccentric 74 is affixed to the lower surface of the top wall 64 by a mounting strap 76. This shakes the filters 62 when operated to cause collected dirt to fall onto the slanted portion 46 of the dividing wall 40. Particularly for larger filter assemblies, two of the shaker motors 72 can be employed in the manifold 60 in spaced relationship.

Lifting rings 78 are affixed to the upper surface of the top wall 64. These enable the entire filter assembly 58 to be lifted out of the hopper 24 through an opening in a hopper extension 80 (FIG. 2), the opening normally being closed off by a lid 82.

The manifold 60 is removably supported in the hopper 24 on an inner frame 84 by four corner plates 86 (FIGS. 2 and 3) mounted on the frame by shock mounts 88. These enable the filter assembly 58 to shake when the shaker motor 72 is operated. At the same time, the assembly can be removed from the hopper without requiring the loosening or removal of any fasteners or the like.

The bottom wall 70 of the manifold 60 has three openings 90 (FIGS. 3 and 4) for the three filters 62, with the openings having transverse webs 92 thereacross. Threaded connectors 94 have flanges 96 affixed to the bottom wall 70 around the openings 90 by suitable fasteners 98. The connectors 94 receive threaded nipples 100 which are welded or otherwise suitably affixed to upper end caps 102 of the filters 62. Lower end caps 104 are located at the lower ends of the filters with a filter medium 106 therebetween.

The filter medium is commercially-available and is formed into pleats 108 (FIG. 5) to provide a tremendous amount of filter area in a relatively small space. The inner ends or extremities of the pleats 108 form a generally cylindrical, central, inner chamber 110 in the filter and the outer ends or extremities of the pleats form a generally cylindrical contour. A cylindrical mesh retainer 112 is located at the inner ends of the pleats 108. A wire retainer is located at the outer ends of the pleats 108. The outer retainer comprises a plurality of circumferentially-extending, generally parallel wires 114 affixed to longitudinally-extending generally parallel wires 116 at their intersections. The wires 116, in turn, are affixed to the end caps 102 and 104 and provide structural support for the filter medium 106. The wires 114 and 116 are widely spaced to prevent plugging or clogging, especially when fine particulate material is being swept.

Figure 5:
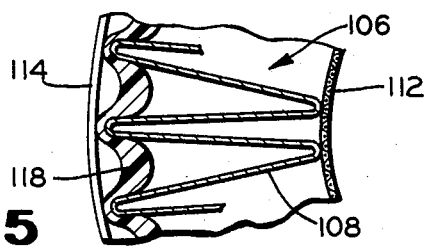
FIG. 5 is an enlarged, somewhat schematic view in horizontal section taken through a portion of one of the filters of FIG. 3.

Since the air flow through the filter medium 106 of the filters 62 is from the outside inwardly, the pleats 108 are maintained in spaced relationship at their outer extremities to avoid collapse. For this purpose, two circumferential strips 118 of plastic material are applied in a liquid or semi-liquid state. As the plastic hardens, it extends into the space between the pleats as shown in FIG. 5 to maintain the spaced relationship thereof.

To establish flow of air through the filter medium 106 from the outside inwardly, a high velocity exhaust blower or other suitable exhaust means 120 (FIG. 2) is employed. This is separated from the dust in the chamber 44 by a partition 121. The inlet of the blower is connected through a duct 122 with an outlet spout 124 (FIG. 3) of the manifold. The outlet of the blower 120 is connected through an outlet duct 106 to a suitable opening 128 in the hopper side wall 28 (FIG. 1). In this manner, air and air-borne dirt are drawn into the dirt- and debris-receiving opening 34, along with the aid of the brush 22, with the air and air-borne dirt then drawn through the inlet 56 to the exhaust chamber 44. The air is drawn into the inner chamber 110 of each of the filters 62 with the air-borne dirt collected on the outer surfaces of the pleats 108 of the filter medium 106. The air then moves through the interior of the manifold 60, through the blower 120, and out of the hopper through the opening 128.

Figure 2:
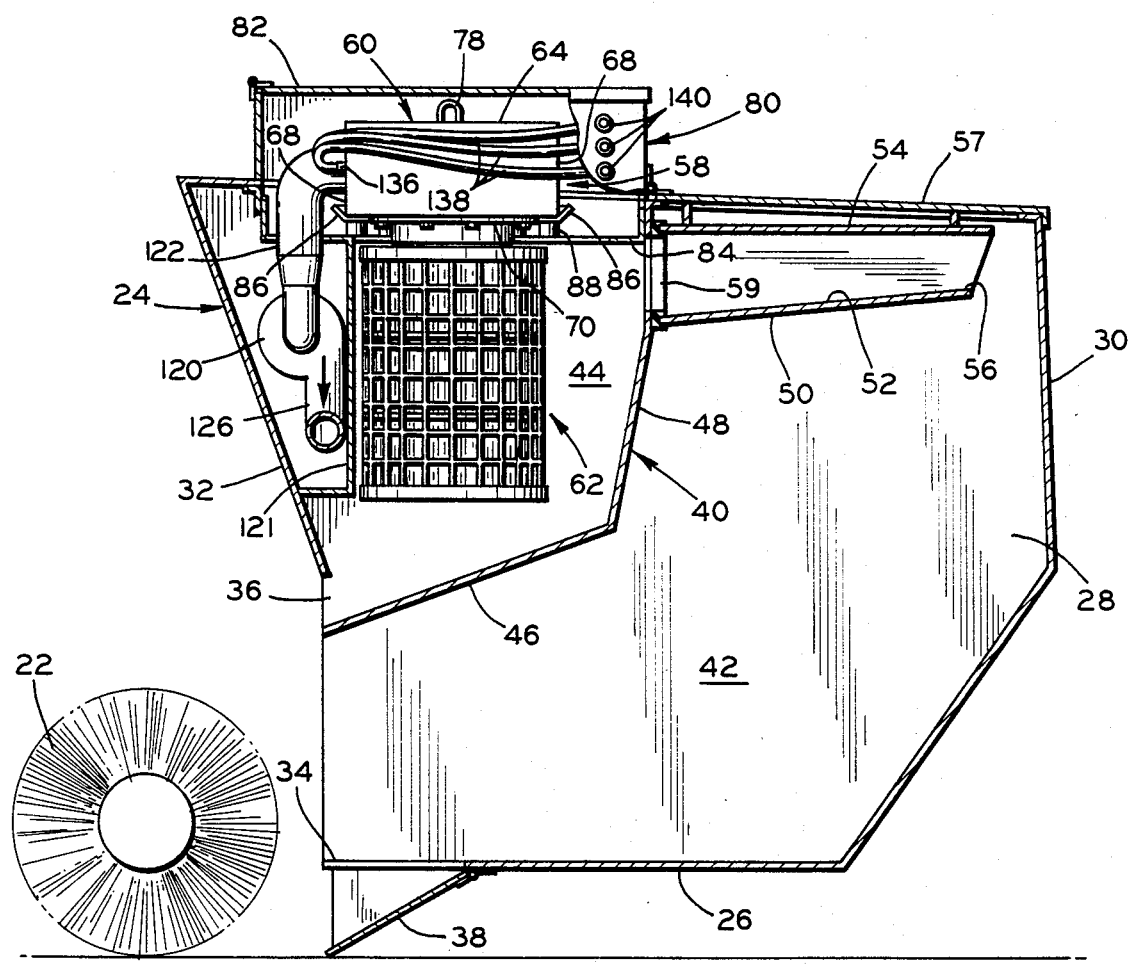
FIG. 2 is a view in longitudinal cross section taken through a hopper of the machine of FIG. 1 and showing the overall filtering system.
Figure 3:
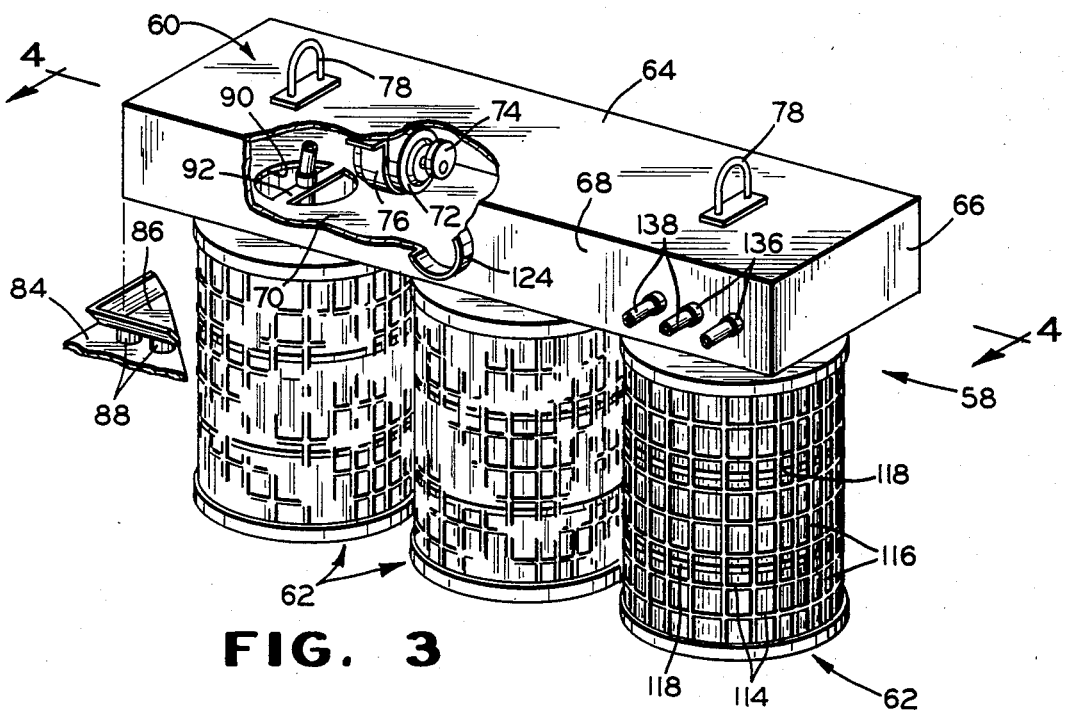
FIG. 3 is an enlarged view in perspective, with parts broken away, of a manifold and filters embodying the invention.
Figure 4:
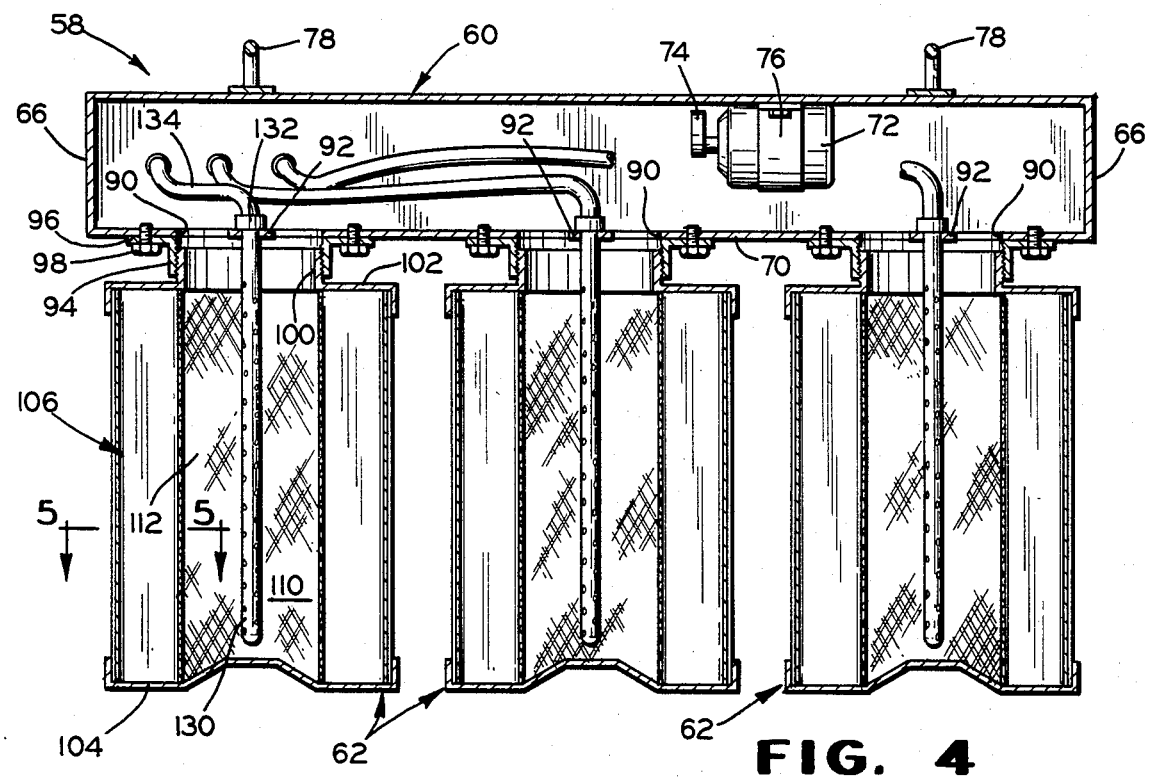
FIG. 4 is a view in section taken along the line 4—4 of FIG. 3.

Particularly with very finely divided particulate material being swept, the operation of the shaker motor 76 may not always be sufficient to shake the collected air-borne material from the outer surfaces of the pleats 108. For further cleaning, air under pressure is supplied to the interior chamber 110 of each of the filters to force the air outwardly in the opposite direction through the filter medium 106 to expel collected dirt from the outer surfaces of the pleats. For this purpose, a perforate supply tube 130 (FIG. 4) extends through substantially most of the length of each of the chambers 110 and is supported at the top by the transverse web 92 through which it extends. A connector 132 is located above the web and connects the tube 130 with a hose or tube 134. These hoses are connected to outwardly-extending nipples 136 in one of the side walls 68 of the manifold 60, as shown in FIGS. 2 and 3. The nipples 136 are connected through long flexible hoses 138 (FIG. 2) to external nipples 140 located in one of the sides of the extension 80.

When it is desired to clean the filters 62 through the use of air under pressure, a source of compressed air can be connected to the external nipples 140 to supply the compressed air to the hoses 138, the nipples 136, the tubes 134, and the supply tubes 130 in the inner chambers 110. Dirt from the filters 62 is collected on the slanted wall portion 46 of the dividing wall 40 and is subsequently dumped through the slot 36 when the contents of the dirt- and debris-receiving chamber 42 are dumped through the opening 44.

When the filters need to be replaced, the overall assembly 58 is removed from the hopper 24 and the filters 62 disconnected from the manifold by unscrewing the nipples 100 from the flanges 94.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. In a machine for sweeping a surface comprising a frame, wheel means supporting the frame on the surface, a rotatable sweeping brush carried by said frame, and a hopper carried by said frame near said sweeping brush, said hopper having a dirt- and debris-receiving opening near said sweeping brush through which dirt and debris are received from said brush, the improvement comprising wall means dividing said hopper into a lower dirt- and debris-receiving chamber and an upper exhaust chamber and defining an air inlet opening communicating between said chambers, a manifold in said exhaust chamber, at least one filter extending from said manifold and having a filter medium defining an outer surface and a central chamber communicating with the interior of said manifold, means for removably supporting said manifold in said exhaust chamber, said removably supporting means comprising a supporting frame in said hopper, and supporting plate means supported on said supporting frame under said manifold and supporting said manifold above said supporting frame, and exhaust means having an outlet communicating with the exterior of said hopper and an inlet communicating with the interior of said manifold.

2. A machine according to claim 1 characterized by said dirt- and debris-receiving opening being located at a lower rear portion of said hopper and said air inlet opening communicating with the chambers being located at an upper forward portion of said hopper.

3. A machine according to claim 1 characterized by said filter medium forming a multiplicity of generally radially-extending pleats with the outer extremities thereof defining a generally cylindrical contour.

4. A machine according to claim 1 characterized by said supporting plate means being mounted on said supporting frame by a plurality of shock mounts.

5. A machine according to claim 1 characterized by said manifold having lifting rings affixed thereto to aid in removing said manifold and said filter from said hopper.

6. In a machine for sweeping a surface comprising a frame, wheel means supporting the frame on the surface, a rotatable sweeping brush carried by said frame, and a hopper carried by said frame near said sweeping brush, said hopper having a dirt- and debris-receiving opening near said sweeping brush through which dirt and debris are received from said brush, the improvement comprising wall means dividing said hopper into a lower dirt- and debris-receiving chamber and an upper exhaust chamber and defining an air inlet opening communicating between said chambers, a manifold in said exhaust chamber, a plurality of filters extending from said manifold and each having a filter medium defining an outer surface and a central chamber communicating with the interior of said manifold, exhaust means having an opening communicating with the exterior of said hopper and an inlet communicating with the interior of said manifold, an air supply tube, one for each of said filters, communicating with the central chamber of the respective filter, said manifold having a plurality of outwardly-extending nipples, one for each of said filters, supply means connecting said outwardly-extending nipples with said air supply tubes, said exhaust chamber having external nipples, one for each of said filters, and flexible lines connecting said outwardly-extending nipples and said external nipples, whereby a supply of air can be connected to said external nipples to supply air to the central chambers of said filters individually.

7. A machine according to claim 6 characterized by said filter medium forming a multiplicity of generally radially-extending pleats with the outer extremities thereof defining a generally cylindrical contour and said central chamber being generally cylindrical and defined by the inner extremities of said pleats.

8. A machine according to claim 7 characterized by said filter having a wire retainer around the pleats with said retainer defining a plurality of circumferentially-extending, generally parallel wires and a plurality of longitudinally-extending, generally parallel wires.

9. A machine according to claim 6 characterized by shaker means affixed to said manifold in the interior thereof for shaking said filter when operated.

10. In a machine for sweeping a surface comprising a frame, wheel means supporting the frame on the surface, a rotatable sweeping brush carried by said frame, and a hopper carried by said frame near said sweeping brush, said hopper having a dirt- and debris-receiving opening near said sweeping brush through which dirt and debris are received from said brush, the improvement comprising wall means dividing said hopper into a lower dirt- and debris-receiving chamber and an upper, rear exhaust chamber, additional wall means forming an air inlet passage extending forwardly of said exhaust chamber, communicating therewith, and having an air inlet opening at an upper, front portion of said hopper, filter means in said exhaust chamber, exhaust means for drawing air from said dirt- and debris-receiving chamber, through said air inlet passage, and through said filter means, a lid hinged at an upper forward portion of said hopper, and means connecting said additional wall means and said lid whereby said additional wall means and said lid can swing away from the hopper together when the hopper is raised and tilted to a high-dump position.

11. A machine according to claim 10 characterized by a gasket being located between rear edges of said additional wall means and said dividing wall means.

* * * * *